United States Patent [19]

Stanelle

[11] 4,182,591

[45] Jan. 8, 1980

[54] APPARATUS FOR TRANSFERRING FLOWABLE MATERIALS FROM A FIRST VESSEL INTO A SECOND VESSEL

[76] Inventor: Karl-Heinz Stanelle, Rosenstr. 4, D-7129 Güglingen 2, Fed. Rep. of Germany

[21] Appl. No.: 881,821

[22] Filed: Feb. 27, 1978

[30] Foreign Application Priority Data

Apr. 15, 1977 [DE] Fed. Rep. of Germany ....... 2716640

[51] Int. Cl.² ............................................. B65G 67/06
[52] U.S. Cl. .................................... 414/291; 414/328; 193/25 C; 141/93; 141/299; 141/285; 141/388; 141/392
[58] Field of Search .............. 214/17 B, 17 C, 17 PH, 214/41; 193/25 C; 141/93, 299, 285, 388, 392

[56] References Cited

U.S. PATENT DOCUMENTS

| | | | |
|---|---|---|---|
| 3,282,793 | 11/1966 | Jamrog ............................... | 214/17 B |
| 3,738,464 | 6/1973 | Ortlip et al. ........................ | 193/25 C |
| 4,061,221 | 12/1977 | Higashinaka et al. .......... | 214/17 B X |
| 4,125,195 | 11/1978 | Sasadi ............................. | 214/17 C X |

*Primary Examiner*—Albert J. Makay
*Attorney, Agent, or Firm*—Peter K. Kontler

[57] ABSTRACT

Apparatus for transferring pulverulent or granular material from an opening at the lower end of a silo into a vessel which is moved to a position below such opening has a vertical duct with a rigid upper section which is affixed to the silo, a rigid lower section which is surrounded by and is rigidly connected to a downwardly tapering funnel and serves to discharge flowable material into the vessel by way of an opening in the top wall of the vessel, and a bellows which is disposed between and is separably connected with the two rigid sections. The lower section and the funnel are movable up and down by means of a winch and several cables or chains whose lower end portions are attached to the funnel and/or to the lower section. A cover which normally overlies the open upper side of the funnel is movable to a raised position in which it surrounds the upper section of the duct. This provides room for insertion of an outer bellows whose lower end portion is sealingly connectable with the upper end portion of the funnel and whose upper end portion is connectable with the marginal portion of the cover. Air which is expelled from the vessel flows between the funnel and the lower section of the duct in the lower position of the cover; such air escapes by way of a pipe on the cover. When the cover is raised and the outer bellows surrounds the bellows of the duct, the compartment admits air into the annular space between the two bellows, and the air again escapes by way of the aforementioned pipe on the cover.

11 Claims, 4 Drawing Figures

APPARATUS FOR TRANSFERRING FLOWABLE MATERIALS FROM A FIRST VESSEL INTO A SECOND VESSEL

BACKGROUND OF THE INVENTION

The present invention relates to improvements in apparatus for transferring or conveying flowable materials from a first vessel (e.g., a stationary silo) into a second vessel (e.g., a mobile container which is mounted on an automotive vehicle or on a railroad car). More particularly, the invention relates to improvements in apparatus for transferring flour, concrete, gravel, sand or other flowable pulverulent and/or granular materials from a first vessel into a second vessel by establishing a path for gravitational flow of material from the first vessel into the second vessel.

It is already known to transfer flowable materials from a silo into a vessel therebelow by utilizing an apparatus which comprises a deformable upright duct whose median section constitutes a bellows and whose lower section is surrounded by a funnel. The lower section and the funnel are movable up and down so that the duct can be lifted above a vessel which is in the process of moving below or in the process of moving away from a position of register with the outlet of the silo, and that the funnel can descend into the opening of an empty vessel which has been placed into a position of register with the silo. The funnel defines with the lower section a compartment for evacuation of air which is expelled from the vessel during admission of flowable material. The means for moving the lower section of the duct and the funnel up or down comprises a winch. Air which is expelled from the vessel into the aforementioned compartment is evacuated by way of a pipe which is attached to the cover of the funnel. It is often necessary to connect the pipe to a suction generating device which promotes the outflow of air at the rate which is necessary to insure that large quantities of flowable material can enter the vessel per unit of time. The connection between the pipe and the suction generating device is flexible in order to allow for up-and-down movements of the funnel with the lower section of the duct. Suction generating devices are normally used when the flowable material is a pulverulent substance. Flexible connections between the suction generating device and the pipe on the cover of the funnel are relatively weak and are likely to be damaged or destroyed. At any rate, such connections are the (or one of the) most sensitive components of the apparatus.

In order to avoid the use of a flexible connection between the suction generating device and the apparatus of the above outlined character, certain apparatus are equipped with a second bellows which surrounds the bellows of the duct and is fixedly secured to the funnel at its lower end and to the upper section of the duct at its upper end. The space between the two bellows constitutes an extension of the aforementioned compartment and communicates with a pipe which is mounted on or carried by the upper section of the duct, i.e., which need not move up or down. This renders it possible to provide a rigid and hence more reliable connection between the suction generating device and the apparatus. As a rule, one can employ a larger and more effective suction generating device if the connection between such device and the apparatus is rigid.

The just discussed modified apparatus is more expensive than the apparatus without a second bellows. Therefore, apparatus with a single bellows will be used whenever possible, i.e., when one can operate without a suction generating device or when the provision of a relatively small suction generating device, with a flexible connection between such device and the apparatus, suffices to insure adequate evacuation of air during flow of material from the silo into the vessel therebelow. However, it happens again and again that the purchaser of an apparatus with a single bellows realizes the need for apparatus with two bellows or vice versa. This involves substantial expenditures including the purchase of a new apparatus or costly and complex conversion of apparatus with one bellows into an apparatus with two bellows. Furthermore, the manufacturer of such apparatus must maintain supplies of discrete parts for each of the two apparatus.

OBJECTS AND SUMMARY OF THE INVENTION

An object of the invention is to provide a novel and improved apparatus which is used for transfer of flexible materials from a first vessel into a second vessel and which is constructed and assembled in such a way that it can be rapidly converted for optimum transfer of a wide variety of flowable materials.

Another object of the invention is to provide an apparatus wherein the conversion can be carried out without discarding any parts which are needed in one form of the apparatus.

A further object of the invention is to provide an apparatus which can be converted, at a low cost, from a structure with two bellows into a structure with a single bellows, or vice versa.

An additional object of the invention is to provide an apparatus wherein the conversion can be carried out by semiskilled or unskilled persons and within a surprisingly short interval of time.

Still another object of the invention is to provide an apparatus which can be converted in a simple and time-saving manner upon completed assembly of or during a late stage of assembly into one of several versions.

An additional object of the invention is to provide an apparatus which, when fully assembled, can be converted in a time-saving manner because the conversion necessitates only partial dismantling.

The invention is embodied in an apparatus for transferring flowable materials from an upper vessel (e.g., a stationary silo) into a lower vessel (e.g., a receptacle which is movable to and from a position below the upper vessel). The apparatus comprises an upright duct including a rigid stationary upper section which serves to receive flowable material from the upper vessel, a rigid lower section which serves to discharge flowable material into the lower vessel, and a deformable median section (e.g., an elongated tubular bellows) which is disposed intermediate the upper and lower sections. The apparatus further comprises a preferably downwardly tapering funnel which spacedly surrounds and is rigidly connected with the lower section of the duct so that the lower section and the funnel define a preferably annular compartment for entry of air which is expelled from the lower vessel during admission of flowble material via duct, a winch and several cables, chains, belts or analogous flexible elements for moving the funnel and the lower section up or down with attendant deformation of the median section of the duct (the funnel and the lower section will be lifted during movement of the lower vessel to or from a position below the upper vessel), an annular cover which is movable lengthwise of the duct between a first position in which it surrounds the lower section and overlies the open upper side of the funnel and a second position in which it surrounds the upper section of the duct, first fastener means (e.g., bolts and nuts, screws or analogous devices) for separably securing the cover to the funnel in the first position of the cover, second fastener means for separably securing the cover to the first section of the duct, an elongated tubular bellows insertable between the cover and the funnel in the second position of the cover (i.e., upon detachment of the first fastener means and upon application of the second fastener means), third fastener means for separably securing the bellows to the cover in the second position of the cover, and fourth fastener means for separably securing the bellows to the funnel in the second position of the cover so that the bellows is deformable with the median section of the duct in response to movement of the funnel and lower section with respect to the upper section of the duct in the second position of the cover.

The upper and lower sections of the duct preferably have cylindrical external surfaces of identical diameters, and the cover is then provided with a circular opening which respectively receives, with minimal or negligible clearance, a portion of the upper section (in the second position of the cover) or a portion of the lower section (in the first position of the cover). The upper section may be provided with brackets or analogous arresting means against which the cover abuts when lifted to the second position. Such brackets may further serve to carry the second fastener means.

As mentioned above, the median section of the duct may constitute an elongated tubular bellows which is spacedly surrounded by the outer bellows in the second position of the cover. The two bellows then define an annular space which communicates with the compartment between the lower section of the duct and the funnel and from which air can be discharged (e.g., into the surrounding atmosphere) by way of one or more pipes on the cover. Such pipe or pipes discharge air which rises in the compartment when the cover is held in the first position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
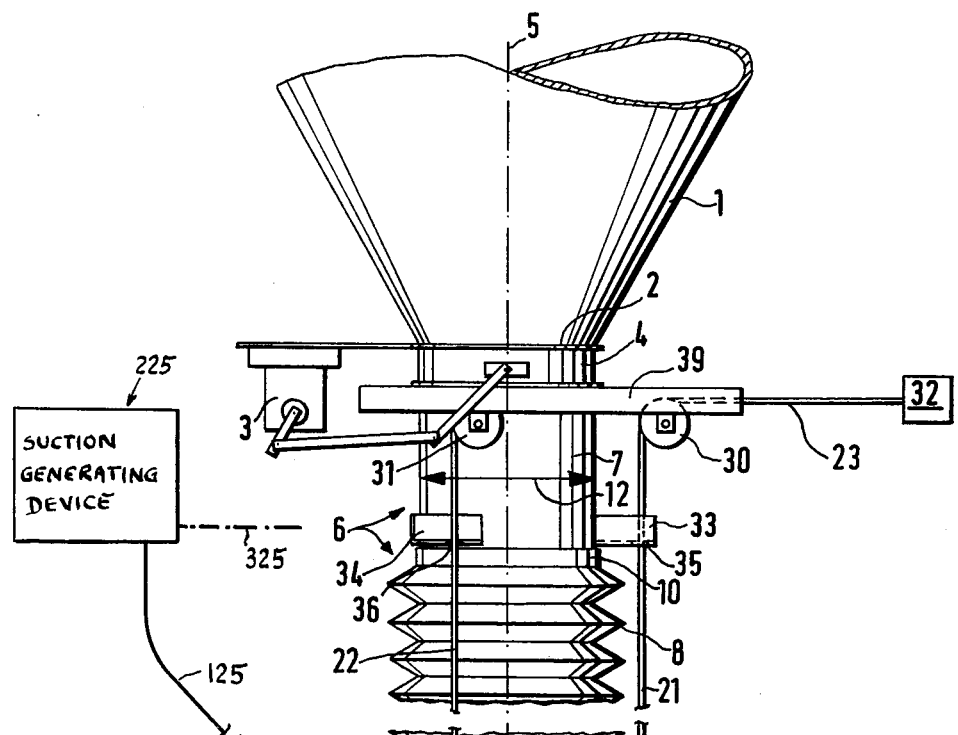
FIG. 1 is a fragmentary elevational view of an apparatus which embodies the invention, further showing a silo and a vessel which receives flowable material from the silo by way of the apparatus.
Figure 2:
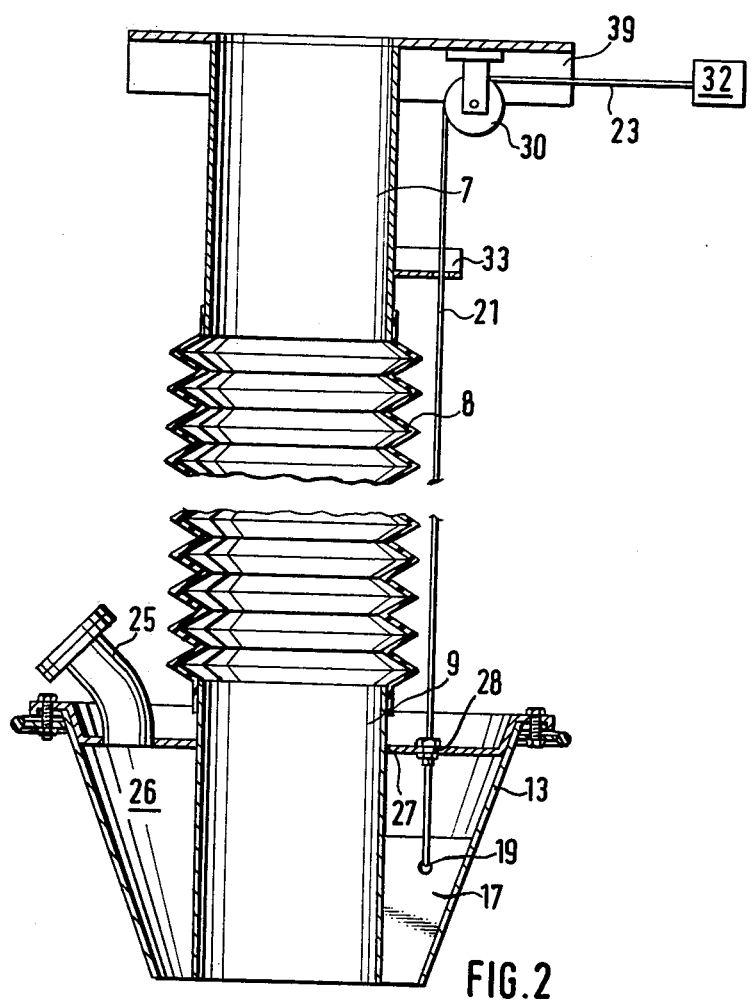
FIG. 2 is a fragmentary axial sectional view of the apparatus of FIG. 1.

Referring first to FIGS. 1 and 2, there is shown an apparatus for conveying granular or pulverulent material (hereinafter called flowable material) into a mobile vessel 41. The apparatus receives flowable material from a stationary vessel (hereinafter called silo) having a downwardly tapering lower end portion 1 with a circular outlet opening 2 which can be exposed or sealed by a gate 4 actuatable by a prime mover 3 through the medium of a suitable linkage. The silo contains or can store a substantial supply of flowable material which is to be admitted into successive vessels 41. When the gate 4 is moved to open position, flowable material can descend from the lower end portion 1 of the silo via outlet opening 2 and circular opening 40 in the top wall of the vessel 41 therebelow by way of the improved apparatus.

The apparatus comprises an upright duct 6 whose axis 5 preferably includes the center of the outlet opening 2 and which includes a tubular (preferably cylindrical) rigid upper section 7, a tubular (preferably cylindrical) rigid lower section 9 and a deformable median section 8 here shown as a bellows which is sealingly but separably secured to the rigid sections 7 and 9. The upper section 7 is rigidly and sealingly affixed to the lower end portion 1 of the silo below the gate 4. The lower section 9 is movable up and down with attendant contraction or expansion of the bellows 8. The outer diameter 12 of the cylindrical external surface of the upper section 7 matches the outer diameter of the cylindrical external surface of the lower section 9. The means for sealingly securing the end portions of the bellows 8 to the respective tubular sections 7 and 9 comprises a rigid upper sleeve 10 which is a part of the upper end portion of the bellows and surrounds the lower end portion of the section 7, and a rigid lower sleeve 11 which is a part of the lower end portion of the bellows and surrounds the upper end portion of the lower section 9. The sleeves 10 and 11 could be welded or adhesively secured to the respective sections 7 and 9; however, it is preferred to resort to screws, bolts and nuts or other suitable removable fasteners. It is desirable to insure that the connections between the bellows 8 and the sections 7 and 9 be leakproof.

The lower tubular section 9 of the duct 6 is surrounded by a downwardly tapering funnel 13 whose axis coincides with the axis 5 of the duct 6 and whose lower portion has an outlet opening 15 with a diameter exceeding the diameter of the open lower end 14 of the section 9. Thus, the lower end portions of the parts 9 and 13 define an annular orifice 16 which serves to admit air into an annular compartment 26 defined by the funnel 13 and by that portion of the section 9 which is surrounded by the funnel. The compartment 26 receives air from the interior of the vessel 41 when the duct 6 admits flowable material from the silo. Such air can be discharged into the surrounding atmosphere by way of a pipe 25 which extends upwardly from a washer-like cover 24 or lid for the open upper end of the funnel 13.

The means for rigidly securing the funnel 13 to the lower section 9 of the duct 6 comprises radially extending webs or ribs including those shown at 17 and 18. It is preferred to provide at least three equally spaced connecting elements. The illustrated webs 17 and 18 are disposed in vertical planes including the axis 5. These webs are preferably welded to the section 9 and funnel 13.

Each of the webs has a hole (FIG. 1 shows the holes 19 and 20) for the lower end portion of one of several (preferably at least three) flexible elements (hereinafter called cables) forming part of a means for moving the section 9 and the funnel 13 up or down relative to the upper section 7 and the lower end portion 1 of the silo. FIG. 1 shows the cables 21, 22 whose lower end portions are anchored in the unit including the parts 9, 13, 17 and 18. For example, the lowermost portions of the cables 21, 22 can be provided with knots large enough to prevent them from passing through the respective holes 19 and 20.

The cover or lid 24 for the upper end portion of the funnel 13 has a circular central opening 27 (see FIG. 2) for the section 9. The clearance between the surface surrounding the opening 27 and the periphery of the section 9 is preferably negligible. The cover 24 is further formed with openings (including the openings 28, 29 for the cables 21, 22) through which the respective cables extend upwardly and along the outer side of the bellows 8. The upper section 7 carries a stationary support 39 for pulleys (including the pulleys 30, 31 for the cables 21, 22), one for each cable. The cables are trained over the respective pulleys and form a set 23 of cables connected to a suitable apparatus 32 (e.g., a winch) which can be actuated to move the section 9 and the funnel 13 up or down. The upper section 7 is further provided with three radially outwardly extending arresting brackets (including the brackets 33, 34 show in FIG. 1) which are respectively provided with openings (35, 36) for the respective cables (21, 22). The opening of each bracket is in register with one of the openings in the cover 24. In the apparatus of FIG. 1, the brackets merely serve as a guide means for the vertical intermediate portions of the respective cables.

The marginal portion 37 of the cover 24 is separably secured to a flange or bead 38 at the upper end of the funnel 13 by screws, bolts and nuts or analogous fasteners 137.

When an empty vessel 41 is to be moved below the silo, the apparatus is held in raised position, i.e., the lower end portions of the section 9 and funnel 13 are located at a level above the top wall of the oncoming vessel. The gate 4 is held in closed position. The attendant then actuates the winch 32 to lower the funnel 13 into the opening 40 of the vessel 41. The vessel is preferably held in such position that the opening 40 is concentric with the opening 14 at the lower end of the funnel. The gate 4 is thereupon moved to open position and the flowable material descends by flowing through the duct 6 and into the vessel 41. Air which is expelled from the vessel 41 as a result of admission of flowable material enters the compartment 26 via orifice 16 and is evacuated through the pipe 25. The latter is preferably provided with a closure for its upper end; such closure is opened only when the gate 4 is held in open position. If desired or necessary, the upper end of the pipe 25 can be coupled to a hose 125 which connects it to a suction generating device 225. The provision of suction generating means promotes the outflow of air from the vessel 41 while the latter receives flowable material via duct 6. The suction generating means may include one or more filters to segregate flowable material from the air stream.

When the vessel 41 is filled to a selected level or to capacity, the gate 4 is closed by the prime mover 3 and the winch 32 is actuated to lift the funnel 13 and the section 9 above the opening 40.

Figure 3:
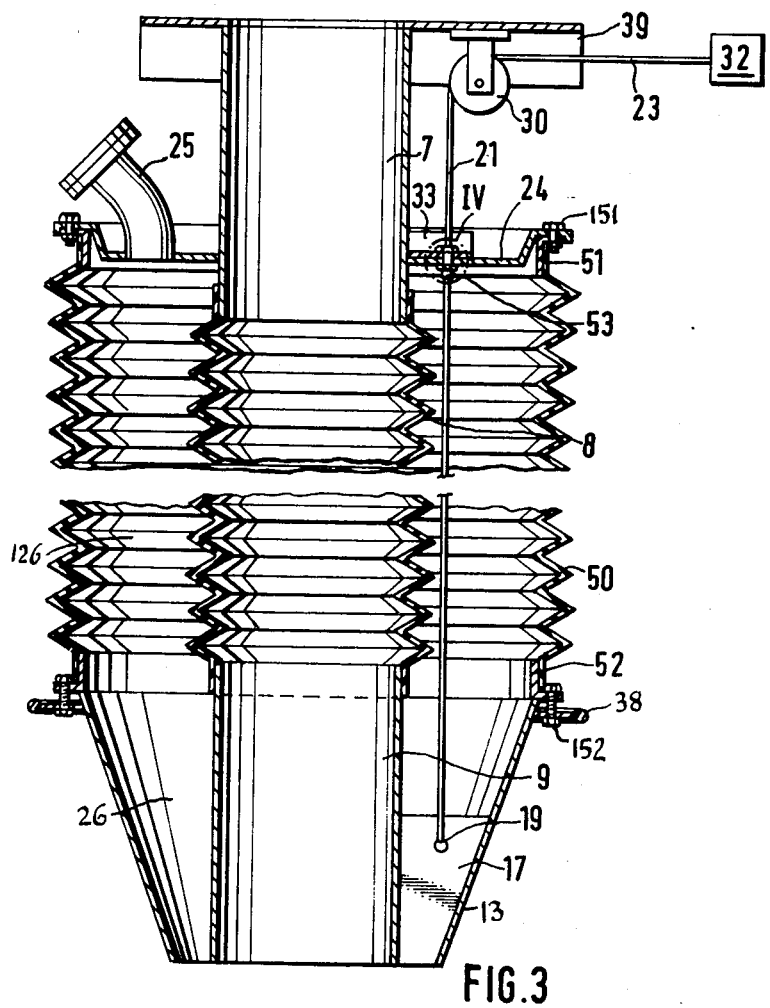
FIG. 3 is a fragmentary axial sectional view of the apparatus upon conversion into a structure with two bellows.

The converted apparatus of FIG. 3 comprises all components of the apparatus of FIG. 1 plus a second or outer bellows 50 which surrounds the bellows 8 of the duct 6 and is installed between the funnel 13 and cover or lid 24. The latter is attached to the upper section 7 of the duct 6, e.g., by being separably secured to the brackets including the brackets 33, 34 by means of fasteners of the type shown in FIG. 4. Thus, the cover 24 does not share the movements of the lower section 9 and funnel 13 when the winch 32 is actuated to displace the parts 9 and 13 relative to the upper section 7 and lower end portion (not shown) of the silo. The annular space 126 between the bellows 8 and 50 constitutes an extension of the annular compartment 26 between the lower section 9 and funnel 13. The stream of air which issues from the opening of a vessel (not shown in FIG. 3) during filling with flowable material rises into the composite annular compartment 26, 126 and is discharged via pipe 25 which may be connected to the suction generating device 225 by a rigid pipe 325 indicated in FIG. 1 by a phantom line. An advantage of the modified apparatus of FIG. 3 is that the connection between the suction generating device 225 and the pipe 25 need not include any flexible hoses or the like because the cover 24 does not share the movements of the funnel 13 relative to the upper section 7 of the duct.

The lower end portion of the outer bellows 50 has a sleeve 52 with an outwardly extending flange which is separably attached to the flange 38 of the funnel 13 by fastener means including bolts and nuts, screws or like devices 152. The connection may further include one or more sealing elements, not specifically shown.

The upper end portion of the outer bellows 50 has a sleeve 51 which is sealingly but detachably secured to the marginal portion 37 of the cover 24 by fastener means 151 including bolts and nuts, screws or the like. The cables (including the cable 21 which is shown in FIG. 3) extend upwardly through the space 126 between the bellows 8 and 50.

Figure 4:
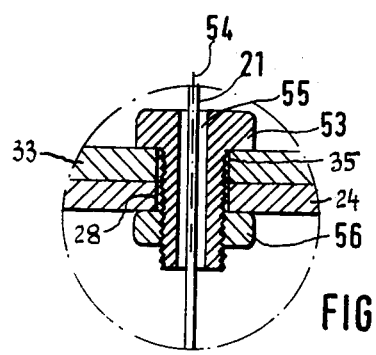
FIG. 4 is an enlarged axial sectional view of a detail within the phantom-line circle IV of FIG. 3.

As shown in FIG. 4 for the cable 21, the aforementioned openings (35, 36 in FIG. 1) for the cables can serve as a means for receiving portions of means for separably fastening the cover 24 to the brackets of the upper section 7. When moved to the position of FIG. 3, the cover 24 abuts against and is arrested by the brackets. The opening 35 of the bracket 33 shown in FIG. 4 registers with the opening 28 of the cover 24, and these openings receive the externally threaded shank of a hollow bolt 53 whose head abuts against the upper side of the bracket 33. The shank of the bolt 53 meshes with a nut 56 which is adjacent to the underside of the cover 24 below the opening 28. The cable 21 (whose axis is shown at 54) extends through the axial passage 55 of the bolt 53. The fastening means between the other brackets of the section 7 and the cover 24 are preferably identical with the fastening means of FIG. 4. It goes without saying that the bellows 50 is long enough to allow for movement of the funnel 13 and section 9 between the selected upper and lower end positions, i.e., that the funnel can descend into the opening of a vessel therebelow when the parts 9, 13 are moved to or close to their lower end positions.

It is preferred to connect the bellows 50 with the cover 24 and funnel 13 in such a way that the quantity of air (and/or flowable material) which can escape therebetween is negligible. In other words, at least the major percentage of air which is expelled from a vessel during filling with flowable material is compelled to pass through the composite compartment 26, 126 and to be discharged via pipe 25.

The apparatus of FIG. 1 can be readily converted into the apparatus of FIG. 3 or vice versa. All that is necessary to convert the apparatus of FIG. 1 is to detach the bellows 8 in order to allow for shifting of the cover 24 from the first position of FIG. 1 to the second position of FIG. 3. The cover 24 is then separably secured to the brackets (including 33 and 34) of the upper section 7, and the lower end portions of the cables (including 21 and 22) are temporarily detached from the respective webs (including 17, 18) of the funnel 13 so as to provide room for introduction of the outer bellows 50. The bellows 8 is thereupon reinserted and attached to the sections 7 and 9 of the duct 6. The cables are reattached to the funnel 13, and the outer bellows 50 is sealingly secured to the marginal portion of the cover 24 and to the flange 38. If the flange 38 is detachable from the main portion of the funnel 13, and if the diameter of the upper end portion of the funnel (without the flange 38) is smaller than the inner diameters of the sleeves 51 and 52, the outer bellows 50 can be slipped over the funnel 13 from below while the cables remain attached to the funnel.

In the illustrated embodiment of the apparatus, the bellows 8 would interfere with lifting or lowering of the cover 24 between the first and second positions of FIGS. 1 and 3, i.e., it is necessary to remove the bellows 8 before the apparatus of FIG. 1 is converted into the apparatus of FIG. 3 or vice versa. Therefore, the sleeves 10 and 11 of the bellows 8 are separable from the respective sections of the duct 6. As mentioned above, the connecting means may include bolts and nuts, screws or any other suitable fastener means which can be applied or removed by resorting to readily available tools. It is also possible to provide the sleeves 10, 11 with internal threads which can be placed into mesh with the external threads at the respective ends of the sections 7 and 9.

An important advantage of the improved apparatus is that the conversion from construction of FIG. 1 to the construction of FIG. 3 or vice versa takes up a minimal amount of time and that such conversion can be carried out without requiring any separate parts (when converting to the construction of FIG. 1) and by requiring only the bellows 50 when the conversion is carried out the other way around. Thus, and if a user possessing the apparatus of FIG. 1 wishes to have it converted into the apparatus of FIG. 3, the conversion can be carried out by the simple expedient of purchasing the bellows 50 and eventually some bolts or other fastening means which is needed to separably secure the cover 24 to the upper section 7 as well as to separably secure the bellows 50 to the marginal portion 37 of the cover 24 and to the flange 38 of the funnel 13. All parts are standardized so that they can be used in both apparatus.

The manufacturer can practically complete the assembly without knowing whether a customer will decide to purchase the form of FIGS. 1-2 or the form of FIG. 3. Thus, the manufacturer assembles the section 7 with the silo, mounts all parts of the moving means 21, 22, 23, 32 on the section 7, and assembles the section 9 with the funnel 13. The cover 24 is attached to the funnel 13, the bellows 8 is mounted between the sections 7 and 9, and the cables 21, 22, etc. are attached to the respective webs in the compartment 26 if the customer orders the form of FIGS. 1-2. If the customer wishes to purchase an apparatus with two bellows, the cover 24 is attached to the section 7, the bellows 8 and 50 are installed in a manner as shown in FIG. 3, and the cables are attached to the webs in the compartment 26.

The cover 24 can be said to constitute a separable portion of the funnel 13. The portion 24 is separated from and lifted above the main portion of the funnel 13 when the apparatus is to be provided with an outer bellows.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. Apparatus for transferring flowable materials from an upper vessel into a lower vessel, comprising an upright duct including a rigid stationary upper section arranged to receive material from the upper vessel, a rigid lower section arranged to discharge material into the lower vessel, and a deformable median section intermediate said upper and lower sections; a funnel spacedly surrounding and rigid with said lower section so that said funnel and said lower section define a compartment for the entry of air which is expelled from the lower vessel during admission of material via said duct; means for moving said funnel and said lower section up or down with attendant deformation of said median section; an annular cover movable lengthwise of said duct between a first position in which it surrounds said lower section and overlies said funnel and a second position in which it surrounds said upper section; first fastener means for separably securing said cover to said funnel in said first position of said cover; second fastener means separably securing said cover to said first section in said second position of said cover; an elongated tubular bellows insertable between said cover and said funnel in said second position of said cover; third fastener means for separably securing said bellows to said cover in the second position of said cover; and fourth fastener means for separably securing said bellows to said funnel in said second position of said cover so that said bellows is deformable with said median section in response to movement of said lower section and said funnel relative to said upper section in said second position of said cover.

2. Apparatus as defined in claim 1, wherein said upper and lower sections of said duct have cylindrical peripheral surfaces of identical diameters and said cover has a circular opening which respectively receives, with minimal clearance, portions of said upper and lower sections in the second and first positions of said cover.

3. Apparatus as defined in claim 1, wherein said upper section includes arresting means against which said cover abuts in said second position thereof.

4. Apparatus as defined in claim 1, wherein said median section includes a second bellows which is spacedly surrounded by said first mentioned bellows in said second position of said cover, said two bellows then defining a space which communicates with said compartment and said cover having means for discharging air from said compartment or from said space.

5. Apparatus as defined in claim 1, wherein said bellows comprises an upper end portion having a first rigid sleeve and a lower end portion having a second rigid sleeve, said third fastener means including devices for separably connecting said first sleeve to said cover in said second position of said cover and said fourth fastener means including devices for separably connecting said second sleeve to said funnel in said second position of said cover.

6. Apparatus as defined in claim 1, wherein said median section includes an upper end portion comprising a first sleeve which sealingly and separably engages said upper section and a lower end portion comprising a second sleeve which separably and sealingly engages said lower section.

7. Apparatus as defined in claim 1, wherein said means for moving said funnel and said lower section includes a plurality of elongated cables having lower end portions attached to said funnel and to said lower section and upper end portions, pulleys provided on said upper section for said cables, and a winch connected with the upper end portions of said cables, said cover having first openings for said cables and said upper section having arresting means against which said cover abuts in said second position thereof, said arresting means having second openings for said cables in register with said first openings in either position of said cover, said cables having portions which are parallel to the axis of said duct and extend between said lower end portions thereof and the respective pulleys.

8. Apparatus as defined in claim 7, wherein said second fastener means includes elements which extend through said first openings and the respective second openings in said second position of said cover.

9. Apparatus as defined in claim 8, wherein said elements have passages for the respective cables.

10. Apparatus as defined in claim 1, further comprising a plurality of webs rigidly connecting said funnel with said lower section, said webs being disposed in said compartment and each thereof being located In a plane including the axis of said lower section.

11. Apparatus as defined in claim 10, wherein said means for moving said funnel and said lower section includes cables having end portions attached to said webs.

* * * * *